(12) United States Patent
Xiong et al.

(10) Patent No.: US 9,499,995 B2
(45) Date of Patent: Nov. 22, 2016

(54) COVERAGE EXTENSION LEVEL FOR COVERAGE LIMITED DEVICE

(71) Applicant: Intel IP Corporation, Santa Clara, CA (US)

(72) Inventors: Gang Xiong, Beaverton, OR (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/300,937

(22) Filed: Jun. 10, 2014

(65) Prior Publication Data

US 2015/0043445 A1    Feb. 12, 2015

Related U.S. Application Data

(60) Provisional application No. 61/863,902, filed on Aug. 8, 2013.

(51) Int. Cl.
| | |
|---|---|
| *H04W 16/26* | (2009.01) |
| *H04W 48/16* | (2009.01) |
| *H04W 52/02* | (2009.01) |
| *E04G 23/02* | (2006.01) |
| *E04H 9/02* | (2006.01) |
| *H04W 24/02* | (2009.01) |
| *H04W 48/12* | (2009.01) |
| *H04W 74/08* | (2009.01) |

(52) U.S. Cl.
CPC .......... *E04G 23/0218* (2013.01); *E04H 9/025* (2013.01); *H04W 16/26* (2013.01); *H04W 24/02* (2013.01); *H04W 48/16* (2013.01); *H04W 52/0219* (2013.01); *H04W 48/12* (2013.01); *H04W 74/0833* (2013.01)

(58) Field of Classification Search
CPC  H04W 16/26; H04W 52/0219; E04H 9/025; E04G 23/0218
See application file for complete search history.

(56) References Cited

U.S. PATENT DOCUMENTS

| | | |
|---|---|---|
| 9,326,122 B2 | 4/2016 | Xiong et al. |
| 2006/0293061 A1 | 12/2006 | Kobayashi et al. |

(Continued)

FOREIGN PATENT DOCUMENTS

| | | |
|---|---|---|
| CN | 105359059 A | 2/2016 |
| CN | 105359476 A | 2/2016 |

(Continued)

OTHER PUBLICATIONS

"U.S. Appl. No. 14/280,799, Non Final Office Action mailed Jul. 13, 2015", 34 pgs.

(Continued)

*Primary Examiner* — Donald Mills
*Assistant Examiner* — Henry Baron
(74) *Attorney, Agent, or Firm* — Schwegman Lundberg & Woessner, P.A.

(57) ABSTRACT

Generally discussed herein are systems, apparatuses, and methods that can provide a coverage enhancement to a coverage limited device. According to an example a method can include determining a received signal strength of a reference signal transmitted from a base station, determining a coverage enhancement based on the determined signal strength, or transmitting a signature sequence of a plurality of signature sequences a first repeated number of times corresponding to the determined coverage enhancement.

20 Claims, 7 Drawing Sheets

(56) References Cited

U.S. PATENT DOCUMENTS

| | | | |
|---|---|---|---|
| 2007/0019578 A1 | 1/2007 | Meiri | |
| 2009/0122736 A1 | 5/2009 | Damnjanovic et al. | |
| 2009/0327395 A1 | 12/2009 | Park et al. | |
| 2011/0080873 A1 | 4/2011 | Zhang et al. | |
| 2011/0199905 A1* | 8/2011 | Pinheiro | H04W 4/005 370/235 |
| 2011/0274040 A1 | 11/2011 | Pani et al. | |
| 2012/0039321 A1* | 2/2012 | Ghosh | H04L 1/0025 370/338 |
| 2012/0087247 A1 | 4/2012 | Min et al. | |
| 2012/0113934 A1 | 5/2012 | Ko et al. | |
| 2012/0163311 A1 | 6/2012 | Park | |
| 2012/0184306 A1 | 7/2012 | Zou et al. | |
| 2012/0207073 A1 | 8/2012 | Kim et al. | |
| 2012/0243431 A1 | 9/2012 | Chen et al. | |
| 2012/0249372 A1 | 10/2012 | Jovicic et al. | |
| 2012/0270584 A1 | 10/2012 | Liang et al. | |
| 2012/0275365 A1 | 11/2012 | Anderson et al. | |
| 2012/0275366 A1 | 11/2012 | Anderson et al. | |
| 2012/0309419 A1 | 12/2012 | Lee et al. | |
| 2013/0028235 A1 | 1/2013 | Barrett | |
| 2013/0044623 A1 | 2/2013 | Speight et al. | |
| 2013/0058306 A1 | 3/2013 | Noh et al. | |
| 2013/0077594 A1 | 3/2013 | Park et al. | |
| 2013/0080597 A1 | 3/2013 | Liao | |
| 2013/0170347 A1 | 7/2013 | Zhang et al. | |
| 2013/0194941 A1 | 8/2013 | Lu et al. | |
| 2013/0195026 A1 | 8/2013 | Johnsson et al. | |
| 2013/0223356 A1 | 8/2013 | Khoshnevis et al. | |
| 2013/0230035 A1 | 9/2013 | Grandhi et al. | |
| 2013/0288608 A1 | 10/2013 | Fwu et al. | |
| 2013/0294399 A1* | 11/2013 | Lee | H04W 4/005 370/330 |
| 2013/0301492 A1 | 11/2013 | Ji et al. | |
| 2013/0310100 A1* | 11/2013 | Lee | H04L 25/0204 455/517 |
| 2013/0322276 A1 | 12/2013 | Pelletier et al. | |
| 2014/0003262 A1 | 1/2014 | He et al. | |
| 2014/0003348 A1 | 1/2014 | Velev et al. | |
| 2014/0010179 A1 | 1/2014 | Lee | |
| 2014/0016614 A1 | 1/2014 | Velev et al. | |
| 2014/0036876 A1 | 2/2014 | Li et al. | |
| 2014/0185529 A1 | 7/2014 | Lim et al. | |
| 2014/0213186 A1 | 7/2014 | Gage et al. | |
| 2014/0213259 A1 | 7/2014 | Teyeb et al. | |
| 2014/0241260 A1 | 8/2014 | Schmidt et al. | |
| 2014/0335867 A1 | 11/2014 | Hsu et al. | |
| 2014/0370904 A1 | 12/2014 | Smith et al. | |
| 2015/0009883 A1* | 1/2015 | Bai | H04W 16/26 370/312 |
| 2015/0016312 A1* | 1/2015 | Li | H04W 74/0833 370/280 |
| 2015/0043403 A1 | 2/2015 | Martinez Tarradell et al. | |
| 2015/0043448 A1 | 2/2015 | Chatterjee et al. | |
| 2015/0043449 A1 | 2/2015 | Bangolae et al. | |
| 2015/0045016 A1 | 2/2015 | Xiong et al. | |
| 2015/0126196 A1 | 5/2015 | Lu et al. | |
| 2015/0163705 A1 | 6/2015 | Lu et al. | |
| 2015/0195831 A1 | 7/2015 | Du et al. | |
| 2015/0257094 A1 | 9/2015 | Wei et al. | |
| 2015/0334693 A1 | 11/2015 | Lu et al. | |

FOREIGN PATENT DOCUMENTS

| | | |
|---|---|---|
| CN | 105359606 A | 2/2016 |
| CN | 105359615 A | 2/2016 |
| CN | 105379316 A | 3/2016 |
| EP | 2509345 A1 | 10/2012 |
| KR | 102009010660 | 10/2009 |
| KR | 1020120039605 A | 4/2012 |
| KR | 1020120137496 A | 12/2012 |
| KR | 102013000667 | 1/2013 |
| KR | 1020130035964 A | 4/2013 |
| KR | 1020160021188 A | 2/2016 |
| TW | 201521505 A | 6/2015 |
| WO | WO-2011099821 A2 | 8/2011 |
| WO | WO-2011112051 A2 | 9/2011 |
| WO | WO-2011119680 A2 | 9/2011 |
| WO | WO-2012136311 A1 | 10/2012 |
| WO | WO-2012177002 A2 | 12/2012 |
| WO | WO-2013012759 A1 | 1/2013 |
| WO | WO-2013025057 A2 | 2/2013 |
| WO | WO-2013048193 A1 | 4/2013 |
| WO | WO-2015021267 A1 | 2/2015 |
| WO | WO-2015021276 A1 | 2/2015 |
| WO | WO-2015021284 A1 | 2/2015 |
| WO | WO-2015021315 A1 | 2/2015 |
| WO | WO-2015021317 A1 | 2/2015 |

OTHER PUBLICATIONS

"Discussion of D2D discovery methods", R1-132068, 3GPP TSG RAN WG1 Meeting #73, (May 2013), 1-5.

"Discussion on design options for D2D discovery", R1-131924, 3GPP TSG RAN WG1 Meeting #73, (May 2013), 1-6.

"International Application Serial No. PCT/US2014/050128, International Search Report mailed Nov. 13, 2014", 8 pgs.

"International Application Serial No. PCT/US2014/050128, Invitation to Correct Defects mailed Aug. 14, 2014", 4 pgs.

"International Application Serial No. PCT/US2014/050128, Written Opinion mailed Nov. 13, 2014", 7 pgs.

"International Application Serial No. PCT/US2014/050147, International Search Report mailed Nov. 13, 2014", 3 pgs.

"International Application Serial No. PCT/US2014/050147, Written Opinion mailed Nov. 13, 2014", 6 pgs.

"International Application Serial No. PCT/US2014/050159, International Search Report mailed Nov. 18, 2014", 3 pgs.

"International Application Serial No. PCT/US2014/050159, Written Opinion mailed Nov. 18, 2014", 7 pgs.

"International Application Serial No. PCT/US2014/050207, International Search Report mailed Nov. 19, 2014", 3 pgs.

"International Application Serial No. PCT/US2014/050207, Written Opinion mailed Nov. 19, 2014", 6 pgs.

"International Application Serial No. PCT/US2014/050209, International Search Report mailed Nov. 27, 2014", 3 pgs.

"International Application Serial No. PCT/US2014/050209, Written Opinion mailed Nov. 27, 2014", 8 pgs.

"ProSe direct communication (D2D)", R1-132174, 3GPP TSG-RAN WG1 Meeting #73, Renesas Mobile Europe Ltd, (May 2013), 1-4.

"Techniques for D2D Discovery", R1-132503, 3GPP TSG RAN WG1 Meeting #73, (May 2013), 1-7.

Alcatel-Lucent, et al., "PRACH coverage extension for MTC devices", R1-130939, 3GPP TSG-RAN WG1 Meeting #72bis, Chicago, USA, [Online]. Retrieved from the Internet: <URL: http://www.3gpp.org/ftp/tsg_ran/wg1_r11/TSGRL_72b/Docs/>, (Apr. 15-19, 2013), 3 pgs.

Ericsson, et al., "D2D for LTE Proximity Services: Overview", 3GPP TSG-RAN WG1 #73, R1-132028, (May 2013), 6 pgs.

"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.

"Evolved Universal Terrestrial Radio Access (E-UTRA); Physical Channels and Modulation", 3GPP TS 36.211 v11.0.0 Technical Specification Group Radio Access Network, Release 11, (Sep. 2012), 106 pgs.

"Evolved Universal Terrestrial Radio Access (E-UTRA); Physical layer procedures", 3GPP TS 36.213 v11.0.0 Technical Specification Group Radio Access Network, Release 11, (Sep. 2012), 143 pgs.

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.

(56) References Cited

OTHER PUBLICATIONS

"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.

"Evolved Universal Terrestrial Radio Access (E_UTRA); Multiplexing and channel coding", 3GPP TS 36.212 v11.0.0, Technical Specification Group Radio Access Network, Release 11, (Sep. 2012), 79 pgs.

"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.

"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 291 pgs.

"Machine-Type and other Mobil Data Applications Communications Enhancements", 3GPP TSG SA WG2 Meeting #92, TD S2-123002; 3GPP TR 23.887 v0.1.0, Release 12, (May 2012), 16 pgs.

"Machine-Type and other Mobile Data Applications Communications Enhancemetns", 3GPP TR 23.887 v1.1.0 Technical Specification Group Services and System Aspects (Release 12), (Sep. 2013), 153 pgs.

"Mobile radio interface Layer 3 specification; Core network protocols; Stage 3", 3GPP TS 24.008 V12.2.0. Technical Specification Group Core Network and Terminals. Release 12., (Jun. 2013), 682 pgs.

"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.

"Study on LTE Device to Device Proximity Services", 3GPP TSG Ran Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.

"Study on provision of low-Cost MTC UEs based on LTE", 3GPP TR 36.888 v2.1.1 Technical Specification Group Radio Access Network, Release 12, (Jun. 2013), 55 pgs.

Andreev, S., et al., "Efficient small data access for machine-type communications in LTE", 2013 IEEE International Conference on Communications (ICC), (2013), 3569-3574.

"U.S. Appl. No. 14/280,799, Response filed Aug. 27, 2015 to Non Final Office Action mailed Jul. 13, 2015", 11 pgs.

"U.S. Appl. No. 14/318,008, Non Final Office Action mailed Oct. 8, 2015", 16 pgs.

"U.S. Appl. No. 14/318,085, Non Final Office Action mailed Oct. 8, 2015", 14 pgs.

"Taiwanese Application Serial No. 103125302, Office Action mailed Sep. 23, 2015", W/ English Translation, 7 pgs.

"Taiwanese Application Serial No. 103125302, Response filed Dec. 17, 2015 to Office Action mailed Sep. 23, 2015", w/ English Claims, 20 pgs.

"U.S. Appl. No. 14/314,957, Non Final Office Action mailed May 12, 2016", 32 pgs.

"U.S. Appl. No. 14/318,008, Final Office Action mailed Apr. 25, 2016", 16 pgs.

"U.S. Appl. No. 14/318,085, Final Office Action mailed May 25, 2016", 15 pgs.

"U.S. Appl. No. 14/318,085, Response filed Mar. 7, 2016 to Non Final Office Action mailed Oct. 18, 2015", 13 pgs.

U.S. Appl. No. 14/318,008, filed Jun. 27, 2014, Signaling Radio Bearer Optimizations and Other Techniques for Supporting Small Data Transmissions.

U.S. Appl. No. 14/318,085, filed Jun. 27, 2014, Power Saving Mode Optimizations and Related Procedures.

U.S. Appl. No. 14/314,957, filed Jun. 25, 2014, Signaling for Proximity Services and D2D Discovery in an LTE Network.

U.S. Appl. No. 14/280,799, filed May 19, 2014, User Equipment and Method for Packet Based Device-To-Device (D2D) Discovery in an LTE Network.

"Korean Application No. 10-2016-7000316, Office Action mailed Sep. 6, 2016", W/English Translation, 9 pgs.

* cited by examiner

200

| GAIN | REPETITIONS |
|---|---|
| 5 dB | 2 |
| 10 dB | 10 |
| 15 dB | 40 |

*FIG. 2*

COVERAGE EXTENSION LEVEL FOR COVERAGE LIMITED DEVICE

RELATED APPLICATION

This application claims the benefit of priority under 35 U.S.C. 119(e) to U.S. Patent Application Ser. No. 61/863,902, filed on Aug. 8, 2013, which is incorporated herein by reference in its entirety.

TECHNICAL FIELD

Examples discussed herein generally relate to device or cellular network coverage enhancement. More specifically, examples generally relate to repeating a transmission of Master Information Block (MIB) for coverage enhancement.

BACKGROUND

Machine-Type Communication (MTC), sometimes referred to as machine-to-machine (M2M) communication, is a promising and emerging technology to help enable a ubiquitous computing environment towards the concept of an "Internet of Things" (an internetworking of things). MTC enables machines to communicate directly with one another.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 2 shows a table detailing an example of coverage enhancement options available to a device in accord with one or more embodiments.

DESCRIPTION OF EMBODIMENTS

Examples in this disclosure relate generally to a mechanism for indicating a coverage extension level for an MTC. More specifically, examples relate to using a Physical Random Access Channel (PRACH) transmission to indicate a coverage extension level for an MTC device.

People and machines excel at different types of tasks. Machines are better at repetitive, well-defined operations, whereas people are better at operations that include insight, inference, interpretation, or operations that are not well-defined. Also, the speed at which a person can perform an operation can be slower than a machine can perform the same operation, or vice versa. As computing capabilities and technology evolve, a machine can become capable of performing an operation that a machine previously was not able to perform. Getting a machine to perform the operation can be more cost effective than having a person perform the operation, because a person is typically an hourly cost, while a machine is a one-time cost (plus maintenance cost). By replacing the person with a machine, the person can be freed to perform an operation that a machine cannot currently perform.

Existing mobile broadband networks (e.g., cellular networks) were designed to optimize performance mainly for human type of communications. The current networks are not optimized for MTC specific requirements. For instance, some MTC devices are installed in basements of residential buildings and these devices would experience significantly greater penetration losses on the radio interface than a network device on a street, for example. In order to help provide sufficient coverage of such MTC devices, special coverage enhancement considerations can be made, such as by using various physical channels.

Note that not all the MTC devices are located in a coverage hole requiring the worst case coverage enhancement target and some MTC device (e.g., User Equipment (UE)) may not need the coverage improvement or may not need the maximum coverage improvement to communicate with a base station (e.g., an eNodeB). Thus, to save resources or power, it can be advantageous to provide a variety of coverage level extensions based on the needs of the varying MTC devices and their locations.

Potential MTC based applications include smart metering, healthcare monitoring, remote security surveillance, intelligent transportation system, among others. These services and applications can help stimulate the design and development of a new type of MTC device that can be integrated into current and next generation mobile broadband networks, such as Long Term Evolution (LTE) or LTE-Advanced (LTE-A).

Figure 1:
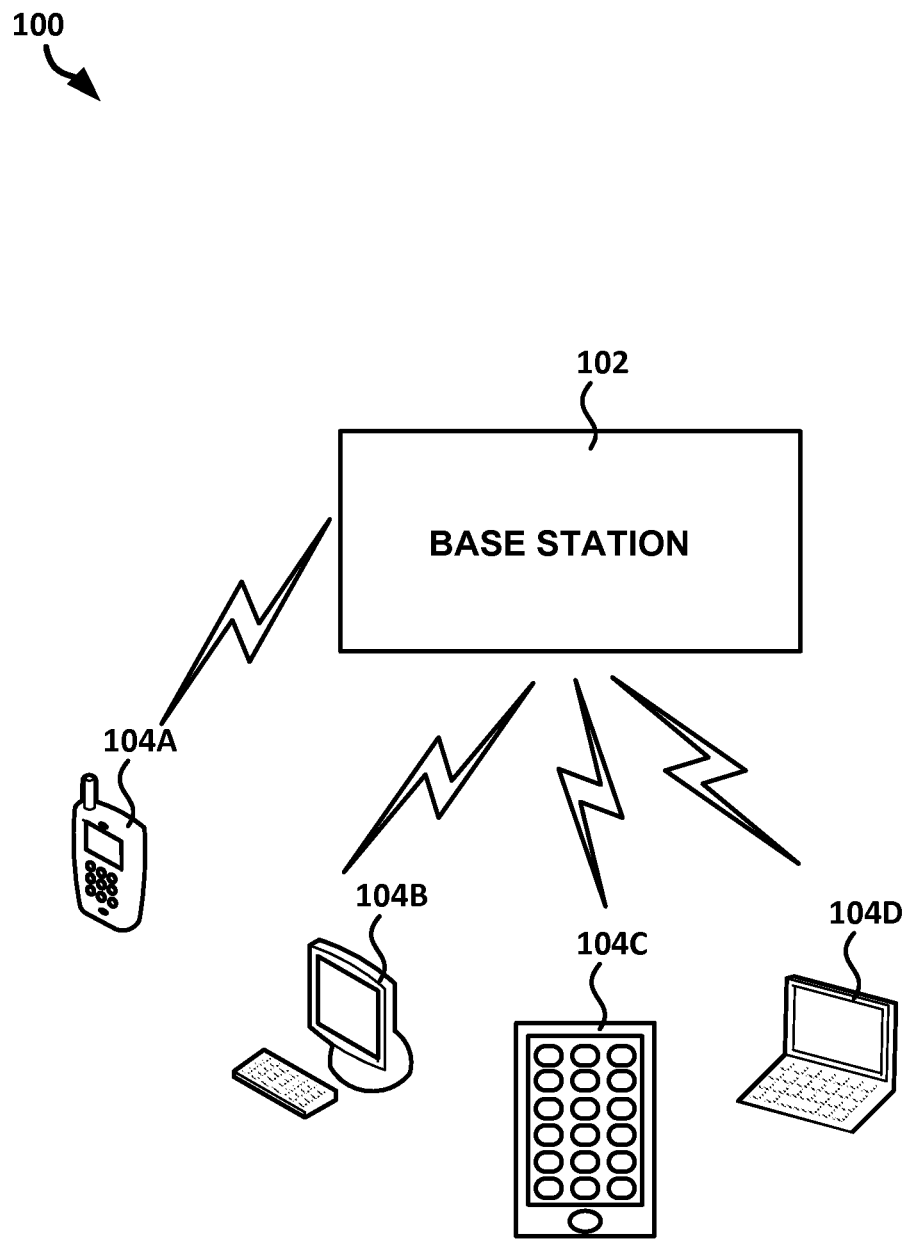
FIG. 1 shows a block diagram of an example of a wireless network in accord with one or more embodiments.

FIG. 1 shows a block diagram of an example of a portion of a cellular network 100, according to one or more embodiments. The cellular network can include a base station 102 communicatively coupled to one or more devices 104A, 104B, 104C, or 104D.

The base station 102 can include a radio transceiver. The base station 102 can receive UpLink (UL) data or a DownLink (DL) request from the device 104A-D. The base station 102 can transmit DownLink (DL) data or a UL request to the device 104A-D. The base station 102 can include an eNodeB, such as when the network 100 is an LTE network. The transceiver of the base station 102 can provide an interface for devices 104A-D to communicate to one another or a data network.

The device 104A-D can include a radio transceiver configured to communicate with the radio transceiver of the base station 102. The device 104A-D can include a phone (e.g., a smart phone), a laptop, a tablet, a personal digital assistant, a desktop computer, or an MTC device, among others. In the example where the network is an LTE network, the device 104A-D can include UE.

An MTC device is an automatically-controlled (e.g., controlled without human interference or interaction after deployment, other than maintenance) or unattended device. Examples MTC devices include a smart fridge that can measure temperature or pressure in the fridge or make a decision on the quality of food in the fridge, telematics (i.e. tracking of vehicles), security devices (e.g., cameras or motion detectors), meter readers, payment machines, vending machines, monitoring devices (e.g., heart rate, oxygen, air quality, blood-glucose, among others), among many others.

An MTC device is distinguished from a human communications device. A human communications device provides services such as voice calling, messaging, or web browsing. MTC devices may not provide such services.

Each of the devices 104A-D illustrated in FIG. 1 can have different requirements for coverage extension levels, such as can include no coverage extension needed to a maximum coverage extension level needed, and any coverage extension in between. For example, a device 104A-D located in a basement can require a coverage extension level in order to communicate with the base station 102, while a device 104A-D outside on a street can have no requirement for a coverage extension to communicate with the base station 102. To help reduce radio resource waste and device 104A-D or base station 102 power consumption, it can be advantageous for the device 104A-D to indicate to the base station 102 how much coverage extension the device 104A-D needs to reliably communicate with the base station 102.

The device 104A-D can indicate the coverage extension level to the base station 102 using a PRACH transmission. A RACH is used by the device 104A-D on a Time Domain Multiple Access (TDMA) enabled network. The network 100 can be operable to accommodate TDMA, Frequency Domain Multiple Access (FDMA), or Code Domain Multiple Access (CDMA). The RACH is generally used by the device 104A-D to communicate with the base station 102 to synchronize the device's transmission with the base station. Communications using the RACH are not scheduled, access to the RACH is random and access collisions can occur. The RACH is a transport-layer channel and the corresponding physical-layer channel is a PRACH.

In LTE and LTE-A systems, RACH is mainly used for the device 104A-D to achieve UL time synchronization. In particular, a RACH procedure can be used for initial access to establish a radio link, resource request when no UL radio resource has been allocated, scheduling request if no dedicated scheduling request has been configured, or re-establishing a radio link after failure, among others.

The process of using a RACH can be classified into two operational modes: contention based and contention free RACH access. The former is applied to the device 104A-D in idle state while the latter is used when the device 104A-D is in a connected state. In the contention based mode of operation, the device 104A-D generally selects one preamble signature at random to transmit the PRACH communication. Note that disjoint subsets of signature sequence are currently allocated for contention based and contention free PRACH access in LTE.

For a device 104A-D that needs a coverage extension to reliably communicate with the base station 102, repeated sending of a PRACH preamble or sequence in the time domain can be an effective way to improve the coverage. The repeated transmissions can accumulate more energy and can provide a mechanism for the communication to be received at the base station 102. The starting sub-frame or repetition time (e.g., time between repeated communications) can be defined. The starting sub-frame or repetition time can be provided by higher layer signaling. Frequency hopping in one transmission or retransmission attempt can be used to further enhance the detection performance. The resulting repetition levels to achieve a coverage enhancement target can depend on the link level performance data (e.g., number of repetitions to achieve a reliable transmission).

Not all devices 104A-D need the worst case coverage enhancement, or any coverage enhancement in some cases. To support the scalability of spectral efficiency impact for coverage improvement, PRACH transmission can be considered as a potential candidate by utilizing various repetition levels to inform the base station 102 on the amount of coverage enhancement the device 104A-D needs. In this manner, unnecessary device 104A-D power consumption and resource waste can be avoided or reduced. Supporting a relatively small number of repetition levels can be desirable to strike a proper balance between system level performance and detection complexity at the base station 102.

PRACH resources can be reserved for or used by MTC devices and other PRACH resources can be reserved for legacy devices. Such a configuration can help reduce a probability of a collision between the legacy devices and the MTC devices. Variable PRACH resource configurations can be used to help the base station 102 identify the devices 104A-D with different repetition levels, and consequently necessary coverage enhancement that device 104A-D needs.

Some considerations in allocating PRACH resources for MTC or legacy devices can include base station detection complexity, collision probability, or access latency, among others.

PRACH resources can be multiplexed in the time or frequency domain or with a non-overlapping subset of a signature sequences, or a combination thereof. While multiplexing the PRACH resources in the frequency domain can be attractive from the device's perspective due to low access latency, frequency domain multiplexing can increase a processing burden at the base station since the base station can be required to detect multiple PRACHs in one subframe. When PRACH resources are multiplexed in the time domain, the base station processing complexity can remain virtually unchanged at the expense of the increased access latency for the device. When using a non-overlapping subset of sequences allocated for PRACH resources, the base station processing complexity can remain approximately the same, but at the cost of a possible increase in collisions.

Figure 2:
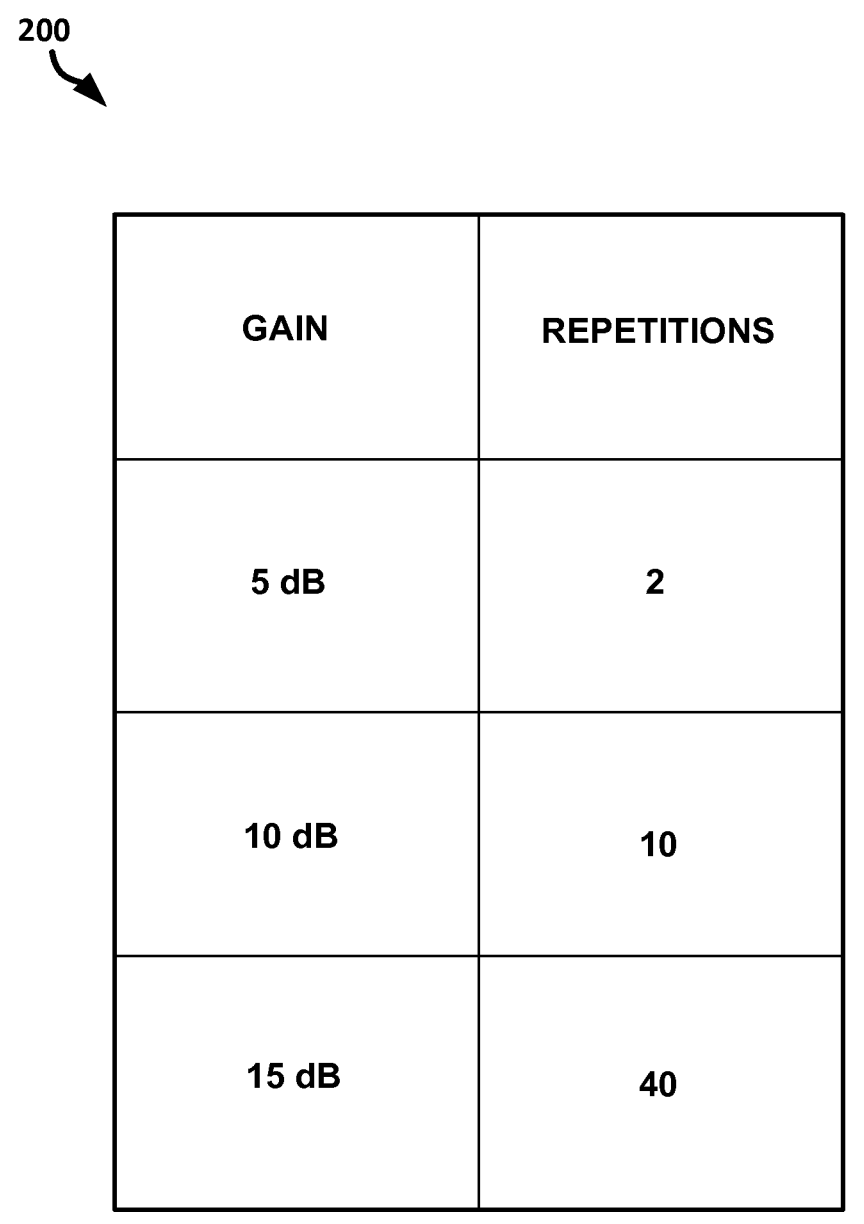

FIG. 2 illustrates an example of a table 200 that defines a gain (e.g., a coverage extension) and the number of times the device 104A-D can transmit (e.g., repetitions) a communication to achieve the gain, according to one or more embodiments. The table 200 supports three repetition levels between the PRACH repetition numbers and different coverage enhancement targets. In this example, three PRACH repetition levels (i.e. two, ten, and forty repetitions) are considered, which correspond to gains of 5 dB, 10 dB, and 15 dB, respectively. It will be understood that different numbers of repetition levels and coverage enhancement targets can be used and supported based on the example of FIG. 2. For example, the base station 102 or the device 104A-D can be configured to transmit using one of five repetition levels or one of ten repetition levels, which each correspond to different signal gains or coverage extensions.

Information detailing the different repetition levels supported by a particular base station can be broadcast to devices in the coverage area (e.g., cell) of the base station. The different repetition levels supported by a base station can be predefined.

Figure 3:
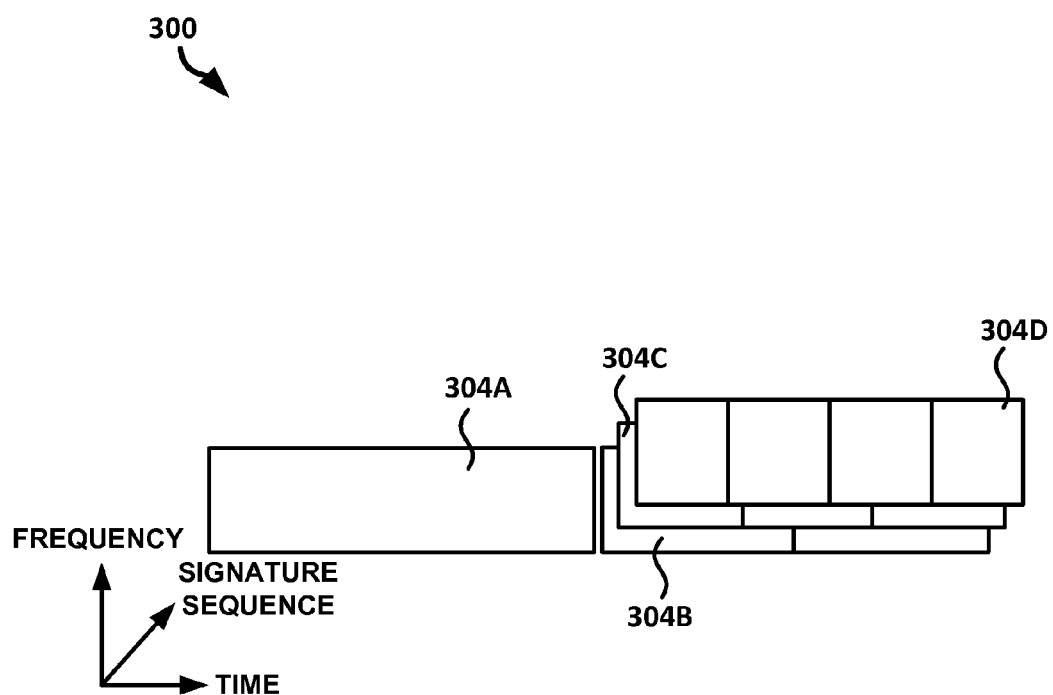
FIG. 3 shows a block diagram of an example of network resources allocated for providing coverage extension to a device in accord with one or more embodiments.

FIG. 3 shows a block diagram of an example of network resources 300 allocated for providing coverage extension to a device, according to one or more embodiments. The network resources 300 can include PRACH resources 304A, 304B, 304C, or 304D. The PRACH resources 304A and 304B-D can be allocated orthogonally in the time domain, such as to provide the PRACH resources 304A that support legacy devices orthogonal to the PRACH resources 304B-D in the time domain, such as shown in FIG. 3. FIG. 3 illustrates an example of PRACH resource allocation that provides for three different coverage extensions, each coverage extension corresponding to a respective PRACH resource 304B-D. The PRACH resources 304A-D of FIG. 3 are illustrated as being configured to operate (receive or transmit) on the same frequency band, while the PRACH resources 304A are configured to operate at a different time period than the PRACH resources 304B-D, such as to make the PRACH resources 304B-D orthogonal to the PRACH resources 304A in the time domain.

PRACH resources 304B-D can each be allocated for different repetition levels. As shown in FIG. 3, the PRACH resources 304B-D can each provide a coverage extension that corresponds to a different number of repetitions (e.g., number of times the device transmits a sub-frame, preamble, frame, or communication). The PRACH resources 304B-D can be multiplexed using non-overlapping subset of signature sequences. For example, the PRACH resource 304B can include a subset of signature sequences that does not include any same signature sequence as any of the signature sequences in the subset of signature sequences of the PRACH resource 304C or 304D.

The starting subframe, subset of signature sequences, repetition level, or the frequency position of PRACH resources 304A-D can be configurable or predefined. The configuration can be signaled (e.g., by broadcast or Radio Resource Control (RRC) signaling), such as by the base station 102. The PRACH resource 304B-D for a coverage limited device can be allocated with a long periodicity. Such a configuration can help reduce an impact on legacy device access to the PRACH resources 304A. In one or more embodiments, non-overlapping sets of Physical Resource Block (PRB) resources (e.g., in the frequency or time domain) can be used in place of non-overlapping subsets of signature sequences.

Figure 4:
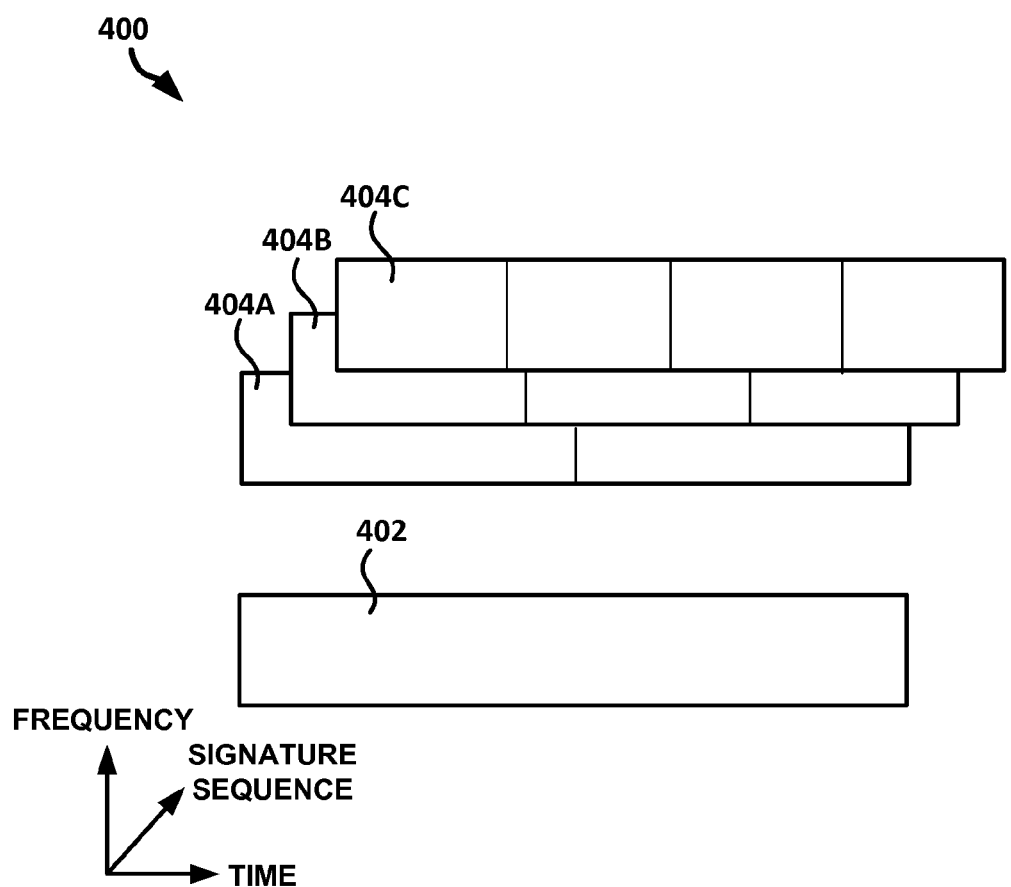
FIG. 4 shows a block diagram of another example of network resources allocated for providing coverage extension to a device in accord with one or more embodiments.

FIG. 4 shows a block diagram of another example of network resources 400 allocated for providing coverage extension to a device, according to one or more embodiments. The network resources 400 can include PRACH resources 402 or 404A, 404B, and 404C.

FIG. 4 illustrates PRACH resources 402 and 404A-C that are allocated separately in the frequency domain. The PRACH resource 402 can be allocated to a first frequency band and the PRACH resources 404A-C can be allocated to a second, different or non-overlapping frequency band. In one or more embodiments, the PRACH resources 402 can be allocated for a legacy device and the PRACH resources 404A-C can be allocated for a coverage limited device, such as an MTC device. The PRACH resources 404A-C can each be allocated for different repetition levels. The PRACH resources 404A-C can be multiplexed and each PRACH resource 404A-C can include a subset of signature sequences that is different or non-overlapping with the other PRACH resources 404A-C.

A PRACH resource allocation scheme, like the one shown in FIG. 4, can provide a scheme that does not significantly increase device complexity, but does increase the computation or hardware complexity for detection at the base station increases.

Similar to the embodiments as described with regard to FIG. 3, the subset of signature sequences can be supplanted with PRB resources. Such a configuration can allow the PRACH resources 404A-C to use non-overlapping PRB resources, respectively.

Similar to FIG. 3, FIG. 4 shows an embodiment with three different extension levels, on corresponding to each PRACH resource 404A-C. It will be understood that fewer or more extension levels can be provided, such as by separating signature sequences or PRB resources into fewer or more (non-overlapping) subsets. Also, FIG. 4 shows that the subset of signatures dedicated to coverage limited devices use the same frequency band, however it will be understood that separate or non-overlapping subframes or frequency bands can be dedicated to a different subset(s) of signature sequences. That is multiple separate or non-overlapping subframes or frequency bands can be dedicated to human type communication devices, MTC devices, or coverage limited devices.

Figure 5:
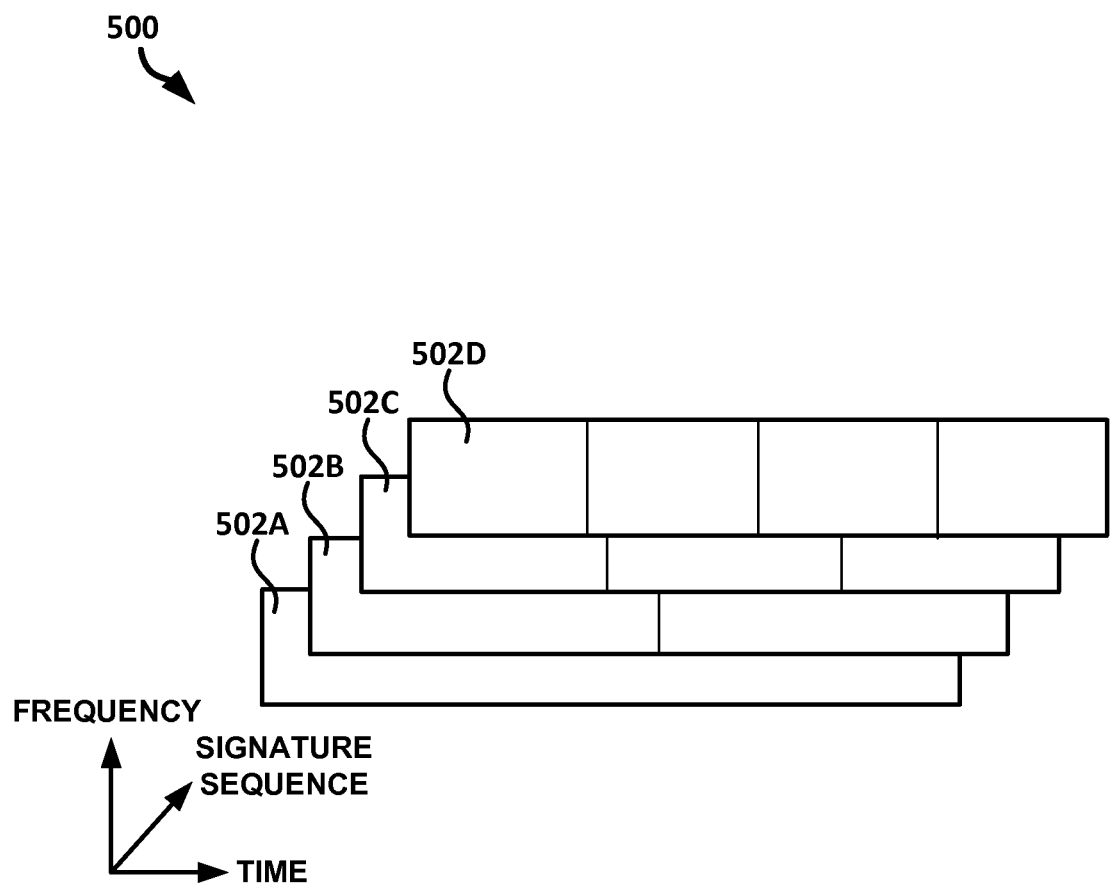
FIG. 5 shows a block diagram of yet another example of network resources allocated for providing coverage extension to a device in accord with one or more embodiments.

FIG. 5 shows a block diagram of another example of network resources 500 allocated for providing coverage extension to a device, according to one or more embodiments. The network resources 500 can include PRACH resources 502A, 502B, 502C, and 502D.

As shown in FIG. 5, PRACH resources 502A-D can be allocated separately with different (e.g., non-overlapping or disjoint) subsets of signature sequences for coverage limited devices with different repetition levels and for legacy devices. FIG. 5 shows an embodiment in which the signature sequences have been split into four subsets, one subset of signature sequences for each of the PRACH resources 502A-D. The subsets of signature sequences can include the same number or different numbers of signature sequences. For example, in a situation where relatively few devices need coverage enhancement, more signature sequences can be allocated for devices that do not need coverage enhancement.

Figure 6:
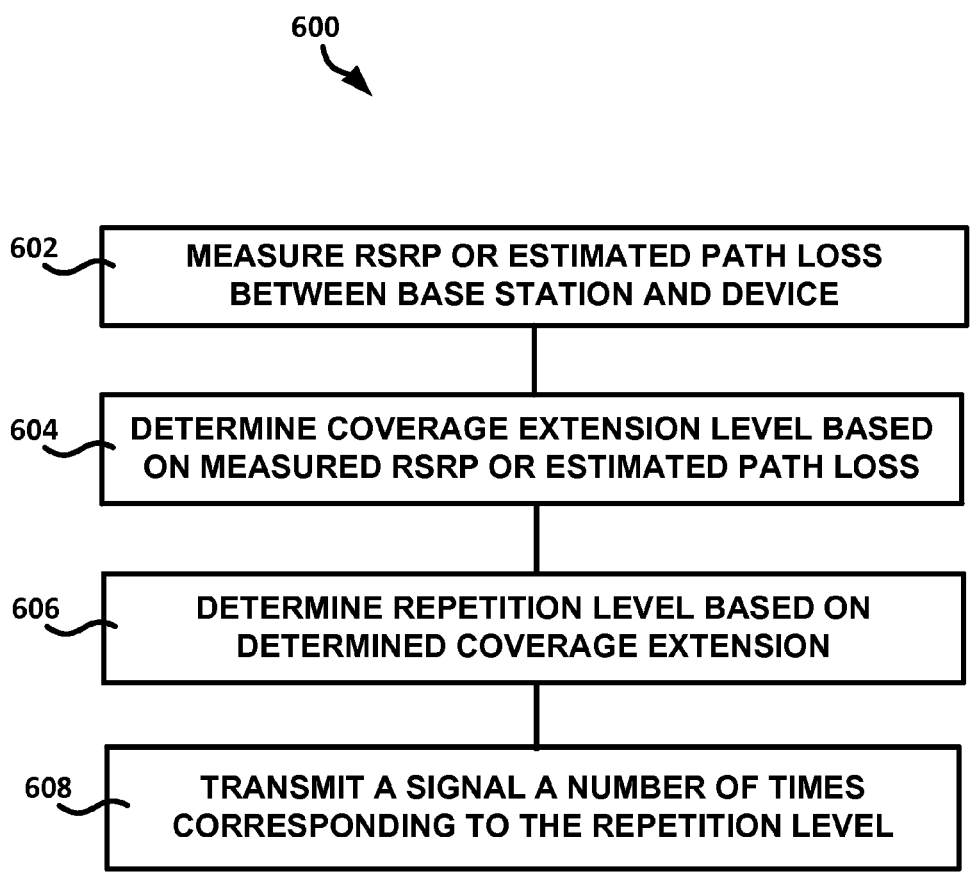
FIG. 6 shows a flow diagram of an example of a method for getting a coverage enhancement in accord with one or more embodiments.

FIG. 6 shows a flow diagram of an example of a method 600 for indicating a coverage extension level, according to one or more embodiments. The PRACH resource can be used to inform the base station on the amount of coverage enhancement a device needs.

The method 600, as illustrated in FIG. 6, can be performed by the modules, components, devices, or systems described herein. 600 includes: measuring a Reference Signal Received Power (RSRP) or an estimated path loss between a base station and a device at operation 602; determining a coverage extension level based on the measured RSRP or estimated path loss at operation 604; determining a repetition level based on the determined coverage extension at operation 606; and transmitting a signal a number of times corresponding to the repetition level at operation 608. The method 600 illustrates operations from the device's perspective and it will be understood that a method, according to one or more embodiments, can include operations from the base station's perspective.

RSRP is an average power of resource elements that carry a Cell-specific Reference Signal (CRS). The device can measure the RSRP and estimate the path loss between base station and the device based on the RSRP or CRS transmit power.

The operation at 604 can include determining the needed coverage extension level (e.g., a required gain, such as in dB) or the repetition level, based on predefined or broadcasted mapping rules as described above (see FIG. 2 for example). The device can look up the needed coverage extension level in a table, such as that shown in FIG. 2, and determine the number of repeated transmissions (the repetition level) that correspond to the coverage extension level.

In one or more embodiments, in an instance where the device determines that it needs a coverage extension level that is not supported by the network, the device can determine the next closest coverage extension level that is supported. The next closest coverage extension level can include a gain that is greater than the coverage extension level that is not supported, so as to help guarantee that a transmission from the device is reliably received at the base station. For example, with reference to FIG. 2, if the device determines that it need a coverage extension level corresponding to a gain of six dB, the device can repeat its transmission ten times, and the base station can determine that the device needs a ten dB coverage extension. In one or more embodiments, the device can use the closest repetition level regardless of whether the extension level is greater or less than the determined extension level needed. In the example in which the device determines that it needs a six dB extension, the device can use the repetition level for the five dB gain instead of the ten dB gain. If using a repetition level does not provide reliable communication, then the device can switch to using the next, greatest repetition level. For example, if the device is communicating by repeating their communication twice with mixed or poor results, the device can switch to repeating the communication ten times, so as to help improve the reliability of the communication.

The method 600 can include, for a contention based random access mode of operation, a device randomly select one preamble signature sequence in the subset of signature sequences for the corresponding repetition level. The operation at 608 can include transmitting the PRACH signal using the associated PRACH resources as described above. Note that the device can utilize the same signature sequence in a repeated PRACH transmission.

The method 600 can include, upon the successful PRACH detection on dedicated resources, determining the coverage extension level requested by the device. The base station can determine this by, for example, counting the number of repeat transmissions from the device. The base station can communicate to the device using the same number of repetitions, or by transmitting a communication to device using a power consistent with the coverage level extension.

In a case where a coverage limited device does not receive a Random Access Response (RAR) communication from the base station, such as after the specified number of retransmission attempts (e.g., one or more), the device can increase the repetition level for the subsequent retransmission attempts, such as to help improve the detection performance.

Figure 7:
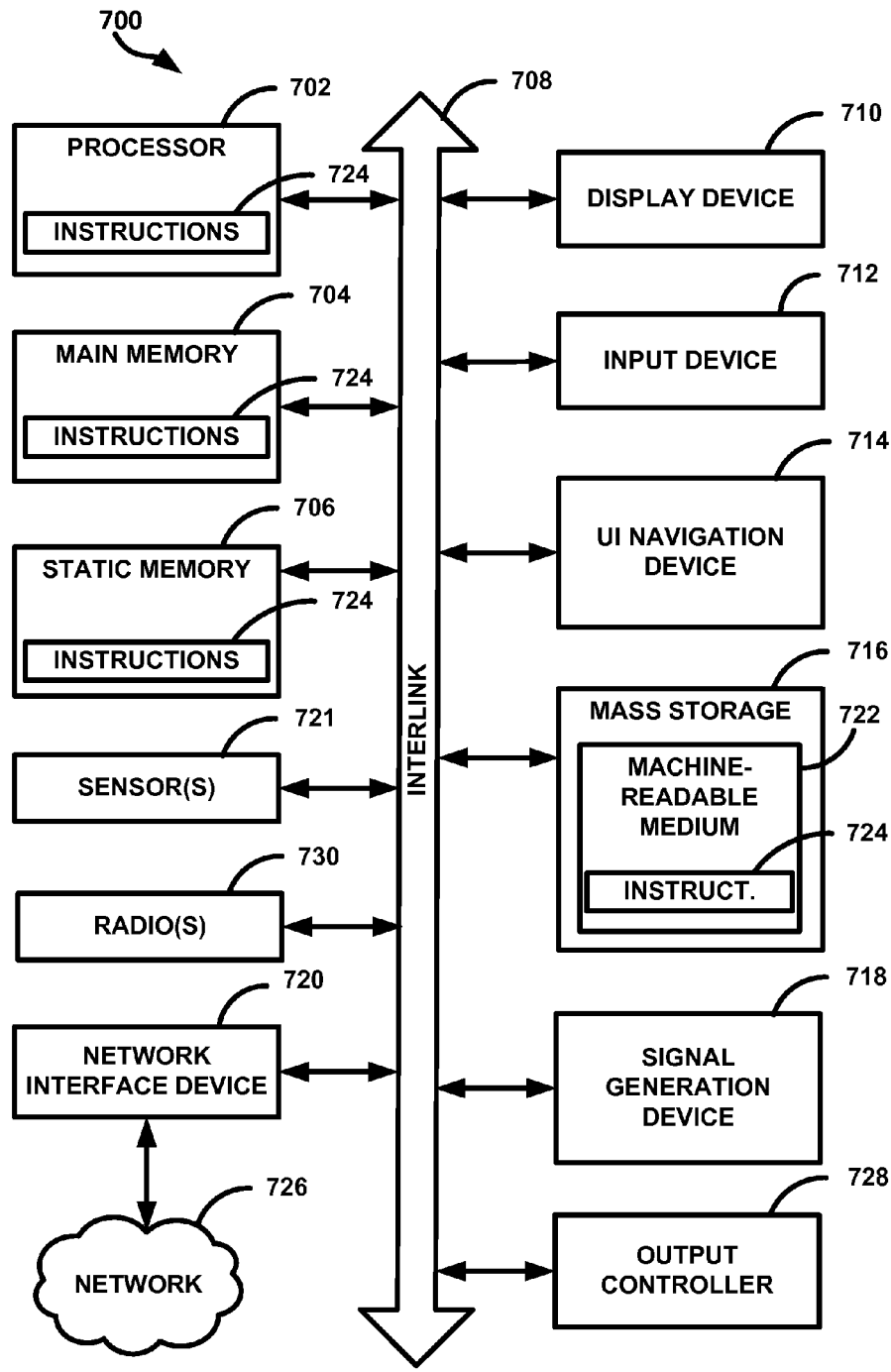
FIG. 7 shows a block diagram of an example of a wireless device in accord with one or more embodiments.

FIG. 7 illustrates a block diagram of an example of a wired or wireless device 700 in accord with one or more embodiments. The device 700 (e.g., a machine) can operate so as to perform one or more of the techniques (e.g., methodologies) discussed herein. In alternative embodiments, the device 700 can operate as a standalone device or can be connected (e.g., networked) to other machines, such as the base station 102 or the device 104A-D. The device 700 can be a part of the base station 102 or the device 104A-D, as discussed herein. In a networked deployment, the device 700 can operate in the capacity of a server machine, a client machine, or both in server-client network environments. In an example, the device 700 can act as a peer machine in peer-to-peer (P2P) (or other distributed) network environment. The device 700 can include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Device (e.g., computer system) 700 can include a hardware processor 702 (e.g., a central processing unit (CPU), a graphics processing unit (GPU), a hardware processor core, or any combination thereof), a main memory 704 and a static memory 706, some or all of which can communicate with each other via an interlink (e.g., bus) 708. The device 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The device 700 can additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The device 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 700 can include one or more radios 730 (e.g., transmission, reception, or transceiver devices). The radios 730 can include one or more antennas to receive signal transmissions. The radios 730 can be coupled to or include the processor 702. The processor 702 can cause the radios 730 to perform one or more transmit or receive operations. Coupling the radios 730 to such a processor can be considered configuring the radio 730 to perform such operations. The radio 730 can be a cellular network radio configured to communicate to a base station or other component of a cellular network.

The storage device 716 can include a machine readable medium 322 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the device 700. In an example, one or any combination of the hardware processor 702, the main memory 704, the static memory 706, or the storage device 716 can constitute machine readable media.

While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the device 700 and that cause the device 700 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 700, and includes digital or analog communications signals or other intangible medium to facilitate communication of such software.

EXAMPLES AND NOTES

The present subject matter can be described by way of several examples.

Example 1 can include or use subject matter (such as an apparatus, a method, a means for performing acts, or a device readable memory including instructions that, when performed by the device, can cause the device to perform acts), such as can include or use determining a received signal strength of a reference signal transmitted from an eNodeB, determining a coverage enhancement based on the determined signal strength, or transmitting a signature sequence of a plurality of signature sequences a first repeated number of times corresponding to the determined coverage enhancement.

Example 2 can include or use, or can optionally be combined with the subject matter of Example 1, to include or use randomly selecting the signature sequence from a plurality of signature sequences dedicated to provide access to Physical Random Access Channel (PRACH) resources and wherein transmitting the signature sequence includes transmitting the randomly selected signature sequence.

Example 3 can include or use, or can optionally be combined with the subject matter of at least one of Examples 1-2, to include or use receiving a broadcast indicating a plurality of coverage enhancement options available to the UE, wherein each coverage enhancement option includes a plurality of PRACH resource signature sequences split into non-overlapping subsets of signature sequences, one subset of signature sequences for each coverage enhancement option.

Example 4 can include or use, or can optionally be combined with the subject matter of Example 3, to include or use, wherein the broadcast indicates that PRACH resources dedicated to human type communication UEs and PRACH resources dedicated to Machine Type Communication (MTC) UEs are orthogonal in the time domain.

Example 5 can include or use, or can optionally be combined with the subject matter of Example 3, to include or use, wherein the broadcast indicates that PRACH resources dedicated to human type communication UEs are arranged to communicate using a first frequency band and PRACH resources dedicated to MTC UEs are arranged to communicate using a second frequency band that does not overlap with the first frequency band.

Example 6 can include or use, or can optionally be combined with the subject matter of at least one of Examples 3-5, to include or use, wherein the plurality of coverage enhancement options include a first coverage enhancement option including a corresponding first repetition level indicating a number of times to repeat a transmission to achieve a first coverage enhancement level and a second coverage enhancement option including a corresponding second repetition level indicating a number of times to repeat a transmission to achieve a second coverage enhancement level, wherein the first coverage enhancement level is greater than the second coverage enhancement level and the first repetition level is greater than the second repetition level.

Example 7 can include or use, or can optionally be combined with the subject matter of at least one of Examples 1-6, to include or use determining that the repeated transmission is not being received by the eNodeB and wherein transmitting a signature sequence of the plurality of signature sequences includes transmitting the signature sequence a second repeated number of times greater than the first repeated number of times in response to determining the transmission is not being received.

Example 8 can include or use subject matter (such as an apparatus, a method, a means for performing acts, or a device readable memory including instructions that, when performed by the device, can cause the device to perform acts), such as can include or use a processor arranged to determine a received signal strength of a reference signal transmitted from an eNodeB and determine a coverage enhancement based on the determined signal strength, or a transceiver arranged to transmit a signature sequence of a plurality of signature sequences a first repeated number of times based on the determined coverage enhancement.

Example 9 can include or use, or can optionally be combined with the subject matter of Example 8, to include or use, wherein the processor is arranged to randomly select the signature sequence from a plurality of signature sequences dedicated to provide access to Physical Random Access Channel (PRACH) resources and wherein the transceiver arranged to transmit the signature sequence includes the transceiver arranged to transmit the randomly selected signature sequence.

Example 10 can include or use, or can optionally be combined with the subject matter of at least one of Examples 8-9, to include or use, wherein the transceiver is arranged to receive a broadcast indicating a plurality of available coverage enhancement options, wherein each coverage enhancement option includes one or more PRACH resource signature sequences split into non-overlapping subsets of signature sequences, one subset of signature sequences for each coverage enhancement option.

Example 11 can include or use, or can optionally be combined with the subject matter of Example 10, to include or use, wherein the broadcast indicates that resources dedicated to human type communication UEs and resources dedicated to Machine Type Communication (MTC) UEs are orthogonal in the time domain.

Example 12 can include or use, or can optionally be combined with the subject matter of Example 10, to include or use, wherein the broadcast indicates that PRACH resources dedicated to human type communication UEs are arranged to communicate using a first frequency band and PRACH resources dedicated to MTC UEs are arranged to communicate using a second frequency band that does not overlap with the first frequency band.

Example 13 can include or use, or can optionally be combined with the subject matter of at least one of Examples 10-12, to include or use, wherein the plurality of coverage enhancement options include a first coverage enhancement option including a corresponding first repetition level indicating a number of times to repeat a transmission to achieve a first coverage enhancement level and a second coverage enhancement option including a corresponding second repetition level indicating a number of times to repeat a transmission to achieve a second coverage enhancement level, wherein the first coverage enhancement level is greater than the second coverage enhancement level and the first repetition level is greater than the second repetition level.

Example 14 can include or use, or can optionally be combined with the subject matter of at least one of Examples 8-13, to include or use, wherein the processor is arranged to determine that the repeated transmission is not being received by the eNodeB and wherein the transceiver is arranged to transmit a signature sequence of the plurality of signature sequences a second repeated number of times greater than the first repeated number of times in response to determining the transmission is not being received.

Example 15 can include or use subject matter (such as an apparatus, a method, a means for performing acts, or a device readable memory including instructions that, when performed by the device, can cause the device to perform acts), such as can include or use a transceiver arranged to receive a transmission from a UE, wherein the transmission is repeated a number of times, and a processor arranged to determine a coverage enhancement of the UE based on the number of times the transmission is repeated, and wherein the transceiver is configured to repeat transmissions to the UE the same number of times as the received transmission from the UE.

Example 16 can include or use, or can optionally be combined with the subject matter of Example 15, to include or use, wherein the processor is arranged to assign a signature sequence of a plurality of signature sequences dedicated to provide access to Physical Random Access Channel (PRACH) resources to the UE based on the number of received, repeated transmissions.

Example 17 can include or use, or can optionally be combined with the subject matter of at least one of Examples 15-16, to include or use, wherein the transceiver is arranged to transmit a broadcast indicating a plurality of available coverage enhancement options, wherein each coverage enhancement option includes one or more PRACH resource signature sequences split into non-overlapping subsets of signature sequences, one subset of signature sequences for each coverage enhancement option.

Example 18 can include or use, or can optionally be combined with the subject matter of Example 17, to include or use, wherein the transceiver arranged to transmit the broadcast includes the transceiver arranged to transmit a broadcast that indicates that resources dedicated to human type communication UEs and resources dedicated to Machine Type Communication (MTC) UEs are orthogonal in the time domain.

Example 19 can include or use, or can optionally be combined with the subject matter of Example 17, to include or use, wherein the transceiver arranged to transmit the broadcast includes the transceiver arranged to transmit a broadcast that indicates that resources dedicated to human type communication UEs are arranged to communicate using a first frequency band and resources dedicated to MTC UEs are arranged to communicate using a second frequency band that does not overlap with the first frequency band.

Example 20 can include or use, or can optionally be combined with the subject matter of at least one of Examples 17-19, to include or use, wherein the plurality of coverage enhancement options include a first coverage enhancement option including a corresponding first repetition level indicating a number of times to repeat a transmission to achieve a first coverage enhancement level and a second coverage enhancement option including a corresponding second repetition level indicating a number of times to repeat a transmission to achieve a second coverage enhancement level, wherein the first coverage enhancement level is greater than the second coverage enhancement level and the first repetition level is greater than the second repetition level.

Example 21 can include or use subject matter (such as an apparatus, a method, a means for performing acts, or a device readable memory including instructions that, when performed by the device, can cause the device to perform acts), such as can include or use receiving a transmission from a UE, wherein the transmission is repeated a number of times, determining a coverage enhancement of the UE based on the number of times the transmission is repeated, repeating a transmission to the UE the same number of times as the number of times the received transmission is repeated from the UE.

Example 22 can include or use, or can optionally be combined with the subject matter of Example 21, to include or use, assigning a signature sequence of a plurality of signature sequences dedicated to provide access to Physical Random Access Channel (PRACH) resources to the UE based on the number of received, repeated transmissions.

Example 23 can include or use, or can optionally be combined with the subject matter of at least one of Examples 21-22, to include or use, transmitting a broadcast indicating a plurality of available coverage enhancement options, wherein each coverage enhancement option includes one or more PRACH resource signature sequences split into non-overlapping subsets of signature sequences, one subset of signature sequences for each coverage enhancement option.

Example 24 can include or use, or can optionally be combined with the subject matter of Example 23, to include or use, wherein transmitting the broadcast includes transmitting a broadcast that indicates that resources dedicated to human type communication UEs and resources dedicated to Machine Type Communication (MTC) UEs are orthogonal in the time domain.

Example 25 can include or use, or can optionally be combined with the subject matter of Example 23, to include or use, wherein transmitting the broadcast includes transmitting a broadcast that indicates that resources dedicated to human type communication UEs are arranged to communicate using a first frequency band and resources dedicated to MTC UEs are arranged to communicate using a second frequency band that does not overlap with the first frequency band.

Example 26 can include or use, or can optionally be combined with the subject matter of at least one of Examples 23-25, to include or use, wherein the plurality of coverage enhancement options include a first coverage enhancement option including a corresponding first repetition level indicating a number of times to repeat a transmission to achieve a first coverage enhancement level and a second coverage enhancement option including a corresponding second repetition level indicating a number of times to repeat a transmission to achieve a second coverage enhancement level, wherein the first coverage enhancement level is greater than the second coverage enhancement level and the first repetition level is greater than the second repetition level.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method performed by a Machine-Type Communication (MTC)
User Equipment (UE) comprising:
receiving a broadcast from an enhanced node B (eNodeB) indicating a plurality of gains available at the eNodeB, a number of repetitions associated with respective gains, and one or more signature sequences to be used when communicating in accord with the number of repetitions, the one or more signature sequences indicating a Physical Random Access Channel (PRACH) to receive transmissions repeated in accord with the corresponding number of repetitions;
determining a received signal strength (RSS) of a reference signal transmitted from the eNodeB;
identifying a gain of the plurality of gains and the number of repetitions associated with the identified gain based on the determined RSS, wherein identifying the gain includes determining that a gain associated with the determined RSS is not supported by the eNodeB and selecting a gain that is greater than the gain that is associated with the determined RSS and is supported by the eNodeB;
selecting a signature sequence associated with the identified number of repetitions associated with the identified gain;
transmitting the selected signature sequence the identified number of repetitions associated with the identified gain; and
receiving, from the eNodeB, a repeated transmission, the repeated transmission repeated the identified number of repetitions.

2. The method of claim 1, wherein selecting the signature sequence includes randomly selecting the signature sequence from a plurality of signature sequences dedicated to provide access to Physical Random Access Channel (PRACH) resources.

3. The method of claim 1, wherein the signature sequences are split into non-overlapping subsets of signature sequences, one subset of signature sequences for each gain.

4. The method of claim 3, wherein the broadcast indicates that PRACH resources dedicated to human type communication UEs and resources dedicated to MTC UEs are orthogonal in the time domain.

5. The method of claim 3, wherein the broadcast indicates that resources dedicated to human type communication UEs are arranged to communicate using a first frequency band and resources dedicated to MTC UEs are arranged to communicate using a second frequency band that does not overlap with the first frequency band.

6. The method of claim 3, wherein the plurality of gains include a first gain including an associated first number of repetitions to achieve the first gain and a second gain including an associated second number of repetitions to achieve a second gain, wherein the first gain is greater than the second gain and the first number of repetitions is greater than the second number of repetitions.

7. The method of claim 3, wherein the identified number of repetitions is the second number of repetitions, the method further comprising determining that the repeated transmission is not being received by the eNodeB and wherein transmitting a signature sequence of the plurality of signature sequences includes transmitting the signature sequence the first number of repeated times in response to determining the transmission is not being received.

8. A Machine Type Communication (MTC) User Equipment (UE) comprising:
 a transceiver arranged to receive a broadcast from an enhanced node B (eNodeB), the broadcast indicating a plurality of gains available at the eNodeB, a number of repetitions associated with respective gains, and one or more signature sequences to be used when communicating in accord with the number of repetitions,
 the one or more signature sequences indicating a Physical Random Access Channel (PRACH) to receive transmissions repeated a corresponding number of repetitions
  a processor arranged to determine a received signal strength (RSS) of a reference signal transmitted from the eNodeB and identify a gain of the plurality of gains and the number of repetitions associated with the identified gain based on the determined RSS, wherein identification of the gain includes determining that a gain associated with the determined RSS is not supported by the eNodeB and the processor is further arranged to select a gain that is greater than the gain that is associated with the determined RSS and is supported by the eNodeB;
 the transceiver further arranged to transmit the selected signature sequence the identified number of repetitions associated with the identified gain, and receive, from the eNodeB, a repeated transmission, the repeated transmission repeated the identified number of repetitions associated with the identified gain.

9. The UE of claim 8, wherein the processor is arranged to randomly select the signature sequence from a plurality of signature sequences dedicated to provide access to PRACH resources to MTC UEs.

10. The UE of claim 9, wherein the signature sequences are split into non-overlapping subsets of signature sequences, one subset of signature sequences for each gain.

11. The UE of claim 10, wherein the broadcast indicates that resources dedicated to human type communication UEs and resources dedicated to MTC UEs are orthogonal in the time domain.

12. The UE of claim 10, wherein the broadcast indicates that resources dedicated to human type communication UEs are arranged to communicate using a first frequency band and resources dedicated to MTC UEs are arranged to communicate using a second frequency band that does not overlap with the first frequency band.

13. The UE of claim 10, wherein the plurality of gains include a first gain including an associated first number of repetitions to achieve the first gain and a second gain including an associated second number of repetitions to achieve a second gain, wherein the first gain is greater than the second gain and the first number of repetitions is greater than the second number of repetitions.

14. The UE of claim 10, wherein the identified number of repetitions is the second number of repetitions, wherein the processor is arranged to determine that the repeated transmission is not being received by the eNodeB and wherein the transceiver is arranged to transmit a signature sequence of the plurality of signature sequences the first number of repeated time in response to determining the transmission is not being received.

15. A non-transitory computer readable storage device including instructions stored thereon, which when executed by a Machine-Type Communication (MTC) user equipment (UE), cause the MTC UE to perform operations comprising:
 receiving a broadcast from an enhanced node B (eNodeB) indicating a plurality of gains available at the eNodeB, a number of repetitions associated with respective gains, and one or more signature sequences to be used when communicating in accord with the number of repetitions, the signature sequences indicating a Physical Random Access Channel (PRACH) to receive transmissions repeated a corresponding number of repetitions;
 determining a received signal strength (RSS) of a reference signal transmitted from the eNodeB;
 identifying a gain of the plurality of gains and the number of repetitions associated with the identified gain based on the determined RSS, wherein identifying the gain includes determining that a gain associated with the determined RSS is not supported by the eNodeB and selecting a gain that is greater than the gain that is associated with the determined RSS and is supported by the eNodeB;
 selecting a signature sequence associated with the identified number of repetitions associated with the identified gain;
 transmitting the selected signature sequence identified number of times associated with the identified gain; and
 receiving, from the eNodeB, a repeated transmission, the repeated transmission repeated the identified number of repetitions associated with the identified gain.

16. The storage device of claim 15, wherein the instructions for selecting the signature sequence include instructions, which when executed by the MTC UE cause the MTC UE to perform operations comprising:
 randomly selecting the signature sequence from a plurality of signature sequences dedicated to provide access to PRACH resources.

17. The storage device of claim 15, wherein the signature sequences are split into non-overlapping subsets of signature sequences, one subset of signature sequences for each gain.

18. The storage device of claim 17, wherein the broadcast indicates that PRACH resources dedicated to human type communication UEs and PRACH resources dedicated to MTC UEs are orthogonal in the time domain.

19. The storage device of claim 17, wherein the broadcast indicates that PRACH resources dedicated to human type communication UEs are arranged to communicate using a first frequency band and PRACH resources dedicated to MTC UEs are arranged to communicate using a second frequency band that does not overlap with the first frequency band.

20. The storage device of claim 17, wherein the plurality of gains include a first gain including an associated first number of repetitions to achieve the first gain and a second gain including an associated second number of repetitions to achieve a second gain, wherein the first gain is greater than the second gain and the first number of repetitions is greater than the second number of repetitions.

* * * * *